Figure 9:
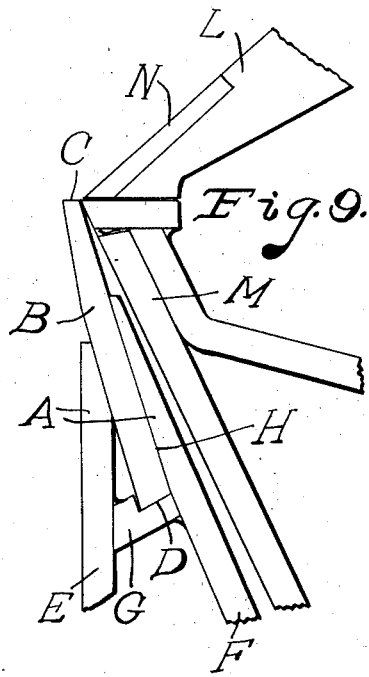

Aug. 3, 1943.   S. BOWMAN   2,325,736
SHEET METAL BRAKE
Filed May 28, 1940   3 Sheets-Sheet 1
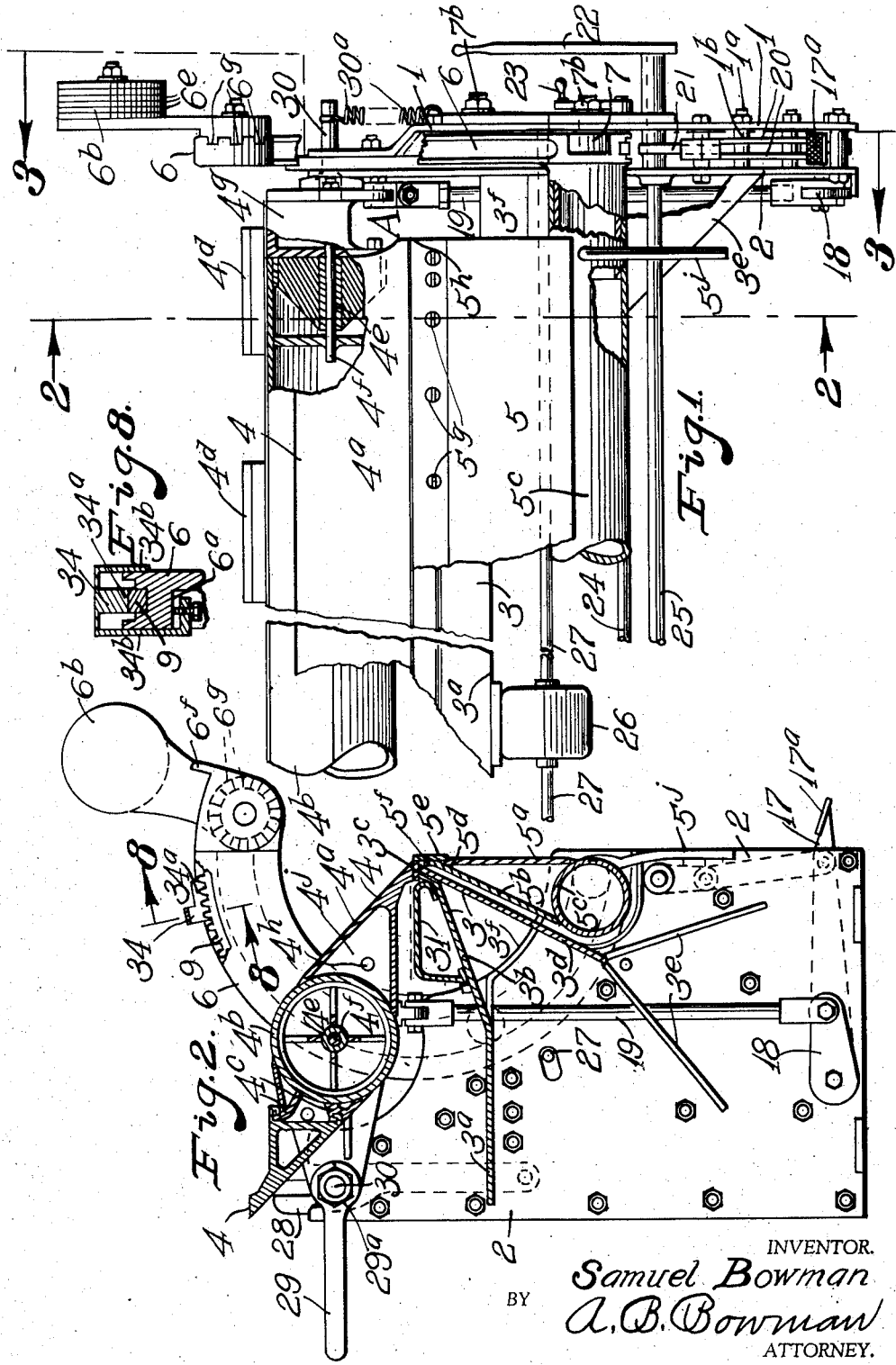
INVENTOR.
Samuel Bowman
BY A. B. Bowman
ATTORNEY.

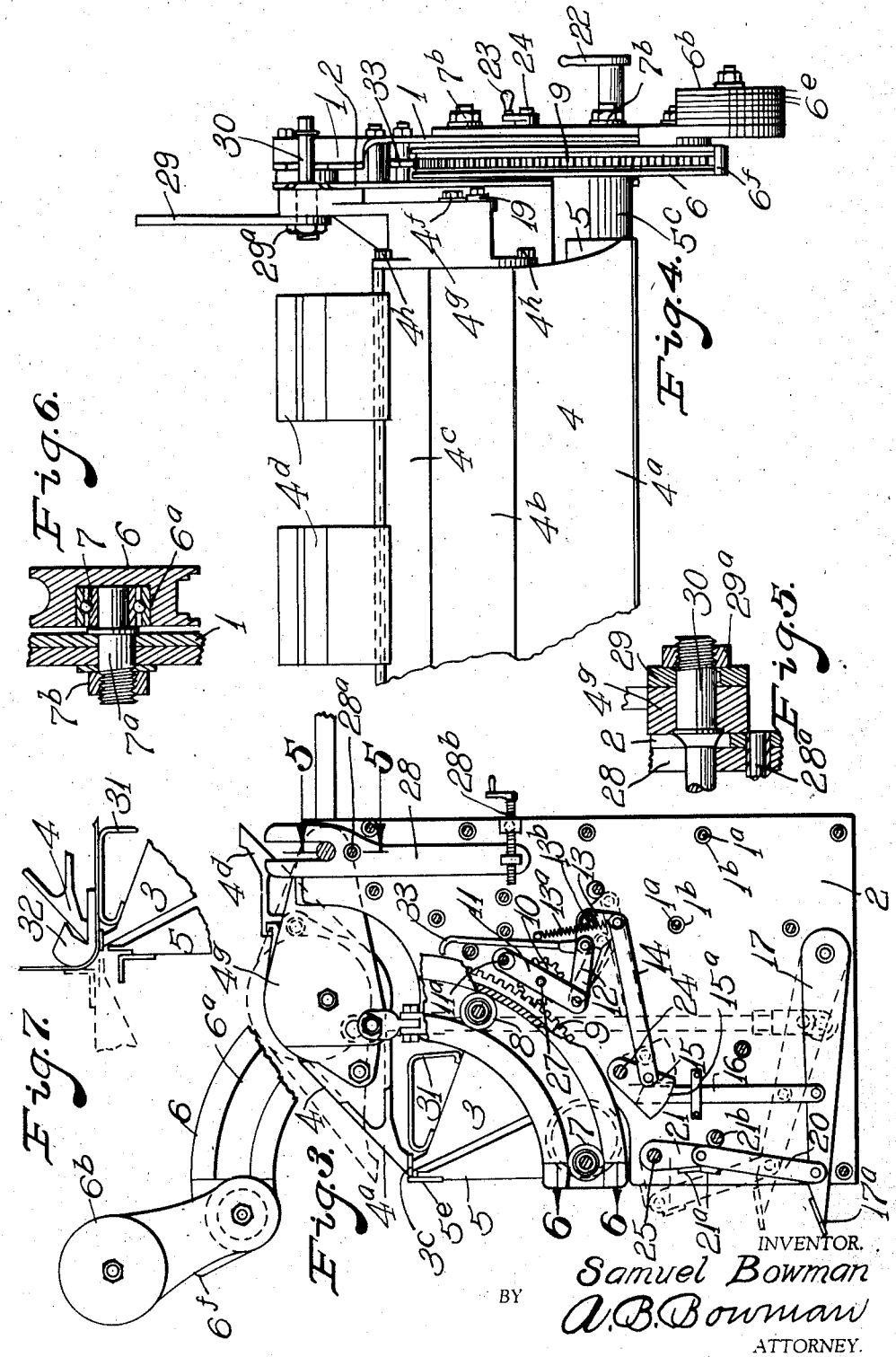

INVENTOR.
Samuel Bowman
BY A.B. Bowman
ATTORNEY.

Patented Aug. 3, 1943

2,325,736

UNITED STATES PATENT OFFICE 2,325,736

SHEET METAL BRAKE

Samuel Bowman, Hollywood, Calif.

Application May 28, 1940, Serial No. 337,652

13 Claims. (Cl. 153—16)

My invention relates to a sheet metal brake for use in bending metal into various shapes and for various purposes and the objects of my invention are:

First, to provide a sheet metal brake of this class in which the clamp members and brake members are so arranged that metal with wide flanged edges can be readily passed through the brake;

Second, to provide a sheet metal brake of this class in which the ends thereof are open permitting metal of greater lengths than the brake member thereof to be bent by shifting the metal longitudinally of the brake;

Third, to provide a sheet metal brake of this class in which large and circular pieces of metal may be bent from the outside to the center thereof in varying degrees;

Fourth, to provide a sheet metal brake of this class with open ends which promotes visibility behind the base plate thereof for determining the position of pieces of sheet metal in the brake;

Fifth, to provide a sheet metal brake of this class in which a sheet of metal the length of the brake member or slightly longer may be passed through the brake from the front to the back of the brake;

Sixth, to provide a sheet metal brake of this class which is provided with a novel brake member and clamp member construction which is very rigid and which reduces to a minimum bending or torsional or other warping of said clamp and brake member;

Seventh, to provide a sheet metal brake of this class which has a maximum depth of throat;

Eighth, to provide a sheet metal brake of this class in which the shiftable clamp member is readily adjustable upwardly, downwardly, forwardly and backwardly;

Ninth, to provide a sheet metal brake of this class in which narrow sheets of metal are supported behind the rear edge of the clamp members so that said sheets of metal do not fall backwardly and downwardly away from the clamp members;

Tenth, to provide a sheet metal brake of this class in which the motor driving means is automatically disengaged from the brake member for automatically stopping the movement of the brake member when said brake member has reached its maximum relative shifted position with the stationary members of my sheet metal brake;

Eleventh, to provide a sheet metal brake of this class in which the brake member is stopped automatically in its movement relatively with the rest of the brake for bending sheet metal therein to various desired predetermined angles;

Twelfth, to provide a sheet metal brake of this class in which the motor driving means automatically remains operatively disconnected from the brake member when the clamp members are in open position;

Thirteenth, to provide a sheet metal brake of this class in which the shiftable clamp member is provided with two braking edges and is arranged to be pivotally shifted so that one of said edges may be used in bending sides of pans or the like;

Fourteenth, to provide a sheet metal brake of this class which may be arranged for use in forming curved corners or moldings of sheet material; and Fifteenth, to provide a sheet metal brake of this class which may be operated by power or manually, as desired, by simply shifting the power operating gear;

Sixteenth, to provide a sheet metal brake of this class which is very simple and economical of construction in accordance with its utility, efficient in its action and which will not readily deteriorate or get out of order.

Figure 10:
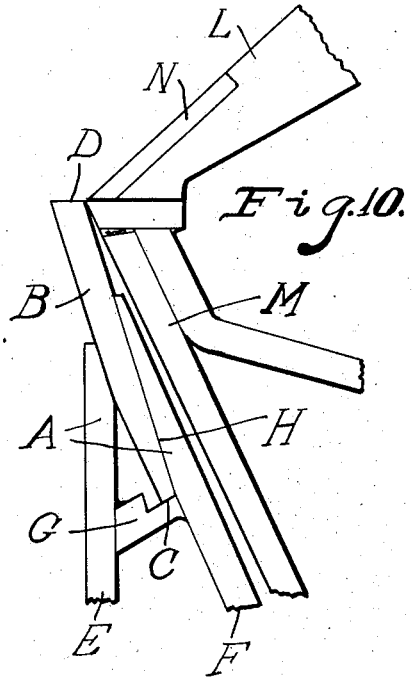
Figure 11:
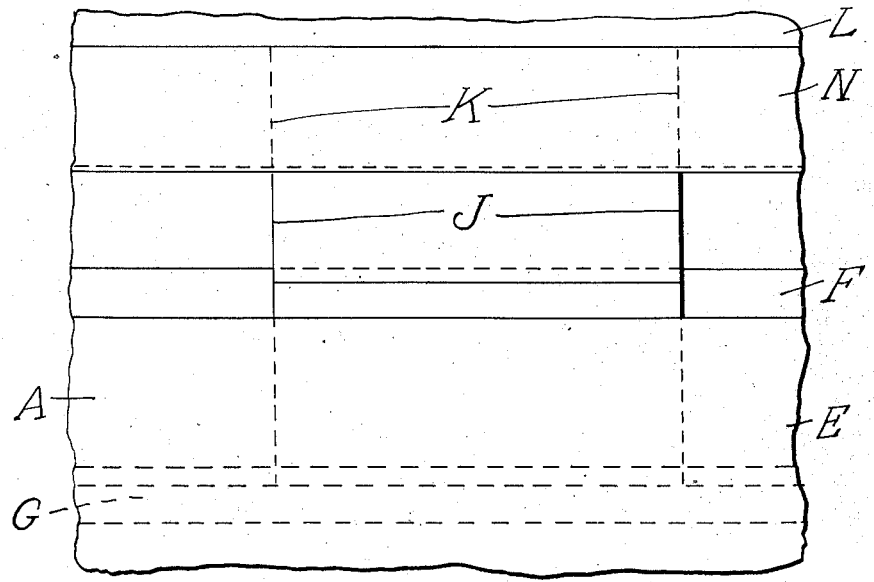

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a fragmentary front elevational view showing one end of my sheet metal brake with parts and portions thereof broken away and in section to facilitate the illustration; Fig. 2 is a transverse sectional view taken from the line 2—2 of Fig. 1 showing a portion broken away to facilitate the illustration; Fig. 3 is a fragmentary transverse sectional view taken from the line 3—3 of Fig. 1; Fig. 4 is a fragmentary top or plan view showing one end of my sheet metal brake; Fig. 5 is an enlarged fragmentary sectional view taken from the line 5—5 of Fig. 3 showing parts in elevation to facilitate the illustration; Fig. 6 is an enlarged fragmentary sectional view taken from the line 6—6 of Fig. 3 showing parts in elevation to facilitate the illustration; Fig. 7 is a fragmentary elevational view showing means in connection with the clamp member of my sheet metal brake for forming moldings or the like; Fig. 8 is an enlarged fragmentary sectional view taken from the line 8—8 of Fig. 2; Fig. 9 is an enlarged fragmentary view showing a modified form of the clamp and brake member of my sheet metal brake; Fig. 10 is a similar view to Fig. 9 showing a part of the brake member in inverted relation comparatively with the part as shown in Fig. 9 of the drawings and Fig. 11 is an enlarged fragmentary front elevational view of the modified structure as shown in Figs. 9 and 10 of the drawings.

Similar characters of reference refer to similar parts and portions throughout the several views of the drawings.

The frame members 1 and 2, stationary clamp member 3, shiftable clamp member 4, brake member 5, brake member rocker arms 6, rocker arm bearings 7 and 8, rocker arm gear racks 9, rocker arm operating gears 10, operating gear control members 11, 12, 13 and 14, latch members 15 and 16, clamp member operating levers 17 and 18, clamp member operating link 19, clamp fastening members 20 and 21, fastening member control lever 22, latch member control lever 23, control shafts 24 and 25, motor 26, motor shafts 27, clamp member adjusting levers 28 and 29, eccentric pin 30, metal supporting member 31, molding form member 32, gear disengaging member 33, and the rocker arm clip member 34 constitute the principal parts and portions of my sheet metal brake.

The frame members 1 and 2 are substantially flat, plate like members and are secured together in spaced relation with each other by means of the bolts 1a and the spacers 1b which spacers 1b are positioned between the frame members 1 and 2 on the bolts 1a, as shown best in Figs. 1 and 3 of the drawings. It will be noted that the opposite ends of my sheet metal brake are duplicate and that each end of the sheet metal brake is supported by frame members 1 and 2 which are secured in spaced relation to each other, as shown best in Fig. 1 of the drawings.

The stationary clamp member 3 is secured at its opposite ends intermediate the frame members 2 preferably by welding, but may be otherwise secured between these frame members 2 at its opposite ends. This stationary clamp member 3 is provided with a substantially horizontal plate portion 3a, as shown best in Fig. 2 of the drawings and integral with this horizontal portion 3a is an upwardly and angularly extending portion 3b on the extending end of which is positioned a clamp braking edge member 3c. Secured on the under side of this edge member 3c is an inwardly and downwardly extending portion 3d which is supported and braced at its opposite ends by the substantially triangular brace portions 3e which are secured on the inner side of the frame members 2 in angular relation with each other having their upwardly extending ends secured to the lower edge of the portion 3d by welding or otherwise. Integral with the horizontal portion 3a of the stationary clamp member 3 are forwardly and downwardly extending portions 3f positioned at opposite ends of the forwardly and upwardly extending portion 3b as shown best in Figs. 1 and 2 of the drawings.

The shiftable clamp member 4 is provided with a substantially triangular in cross section clamp portion 4a, the base of which is welded or otherwise secured to a tubular member 4b, as shown best in Figs. 1 and 2 of the drawings. This tubular member 4b is arranged in coextensive relation with the clamp portion 4a of the shiftable clamp member 4. Secured on the tubular member 4b in opposed relation with the clamp portion 4a are track members 4c which are arranged to support the pan forming clamp members 4d in interlocked relation, as shown in Fig. 2 of the drawings, it being noted that these pan forming clamp portions 4d are longitudinally shiftable on the track members 4c. Centrally mounted in opposite ends of the tubular member 4b are journal members 4e which are revolubly positioned on the bolt 4f, all as shown best in Figs. 1 and 2 of the drawings. This bolt 4f is secured in the clamp member supporting brackets 4g which are secured on opposite ends of the shiftable clamp member 4 and are pivotally mounted on the eccentric pins 30, as shown best in Figs. 3, 4 and 5 of the drawings. The bolts 4h screw threaded in the ends 4j of the shiftable clamp member 4 maintain the rigid connected relation of the clamp member supporting brackets 4g with the tubular member 4b. The clamp member supporting brackets 4g being mounted on the eccentric pins 30 at opposite ends of the shiftable clamp member 4 are readily adjustable forwardly and backwardly providing relative adjustment of the forward edge of the shiftable clamp member 4 with the edge portion 3c of the stationary clamp member 3, it being noted that the eccentric pin 30, as shown in Fig. 5 of the drawings, is supported in the clamp member adjusting lever 28 which is pivotally mounted on the bolt 28a secured to the frame member 2. The lower end of the clamp member adjusting lever 28 is arranged to be pivotally adjusted on the bolt 28a by the screw 28b. Fixed on the eccentric pin 30 by means of the nut 29a is the clamp member adjusting lever 29. This lever 29 is arranged to revolve the eccentric pin 30 for use in shifting the shiftable clamp member 4 backwardly and forwardly as hereinbefore described. It will be noted that the outwardly extending ends of the eccentric pins 30 are held in spring tensional engagement with the clamp member adjusting lever 28 by means of the tension spring 30a which is secured on one of the bolts 1a projecting outwardly from the side of the frame member 1, as shown best in Fig. 1 of the drawings. Interconnecting the clamp member supporting brackets 4g and the clamp member operating lever 18 is the link 19. Operatively connected with the clamp member operating lever 18 is the clamp member operating lever 17 which is arranged for use in forcing the shiftable clamp member 4 downwardly into engagement with the stationary clamp member 3 by means of pressure exerted by a person's foot on the pedal portion 17a of said operating lever 17, as shown best in Figs. 1, 2 and 3 of the drawings.

The brake member 5 is provided with angularly disposed members 5a and 5b which are welded or otherwise secured to a tubular member 5c which is arranged in coextensive relation with the brake member 5. These portions 5a and 5b are preferably secured together by welding or otherwise at 5d and the brake edge member 5e is secured on the upwardly extending end portion 5f of the portion 5b, by means of the screws 5g, as shown best in Fig. 1 of the drawings.

Secured on opposite ends of the tubular member 5c are the brake member rocker arms 6 which are supported on the rocker arm bearings 7 and 8 which are secured to the frame member 1, as shown best in Figs. 1 and 6 of the drawings. The rocker arm bearings 7 and 8 are each supported on an eccentric shaft 7a which is arranged to be secured in fixed relation with the frame member 1 by means of the nut 7b, providing adjusting means for varying the relative position of the brake member 5 with the clamp members 3 and 4, as shown best in Fig. 6. These brake member rocker arms 6 are provided with arcuate recessed channel portions 6a which are arranged to engage the bearings 7 and 8 in substantially the relation as shown in Figs. 3 and 6 of the drawings. It will be noted that these rocker arms 6 are arcuate and are arranged to support the brake member 5 and shift the same to various radial positions relatively with the front edge of the shiftable clamp member 4, as shown best in Figs. 2 and 3 of the drawings. The arcuate shape of these rocker arms 6 provides shifting means for the brake member 5 which does not hamper the shifting of metal through the ends of the brake, it being noted that the opposite ends of the brake are open a considerable distance backwardly from the front edge of the clamp members 3 and 4, as shown best in Figs. 2 and 3 of the drawings. Secured on these rocker arms 6 at their upwardly extending ends are the counterbalance members 6b which are provided with a plurality of plates 6e providing adjustability of the counterbalance weight thereof. These counterbalance members 6b are each provided with radially disposed interlocking portions 6g arranged to engage each of the rocker arms 6 providing means for changing the angle of the counterbalance weights 6b relatively with the rocker arms 6 when using my sheet metal brake for bending various thicknesses of metal.

Positioned in the outer arcuate edge of these brake member rocker arms 6 are gear racks 9 which are arranged to mesh with the rocker arm operating gears 10 on the motor shafts 27 in connection with the motor 26. It will be noted that the motor 26 is mounted at substantially the middle portion of my sheet metal brake on the lower side of the horizontal portion 3a of the stationary clamp member 3. The motor shafts 27 are relatively long and are revolubly mounted in the operating gear control members 11 and these shafts 27 are arranged to be sprung outwardly away from the rocker arm gear rack 9 for disengaging the rocker arm operating gears 10 from the gear racks 9 in connection with the rocker arms 6 by means of the shiftable operating gear control members 12, 13 and 14 in connection with the operating gear control member 11, as shown by solid lines in Fig. 3 of the drawings, the shifted position of which are shown by dash lines therein. When the rocker arm operating gears 10 are out of mesh with the gear racks 9, the brake member 5 may be manually operated by one of the handle members 5j which are welded or otherwise secured to the lower front side of the opposite ends of the brake member 5 as shown best in Figs. 1 and 2 of the drawings.

The gear disengaging member 33 is positioned with its upwardly extending end in the arcuate path of the outwardly extending portion 6f of the rocker arm 6. When the rocker arm 6 shifts on the bearings 7 and 8, the outwardly extending portion 6f engages the upper end of the gear disengaging member 33 forcing the operating gear control members 11, 12, 13 and 14 into the dash line position, as shown in Fig. 3 of the drawings, disengaging the operating gears 10 from the rocker arm gear racks 9. It will be noted that this portion 6f is arranged to engage the gear disengaging members 33 when the rocker arms 6 have reached their maximum shifted relation with the stationary clamp members 3 and 4 to prevent damage of the brake by the power mechanism.

The rocker arm clip member 34 is arranged to be clipped on the peripheral edge of the rocker arm 6 at various positions thereon for engaging the upper end of the gear disengaging member 33 and stopping the movement of the rocker arms 6 at various desired predetermined positions. It will be noted that this rocker arm clip member 34 is provided with a rack portion 34a which is arranged for engagement with the rocker arm gear racks 9 and that the resilient clip portions 34b are relatively thin and arranged to engage the opposite sides of the peripheral edge of the rocker arms 6, as shown best in Figs. 2 and 8 of the drawings.

The operating gear control member 11 is adjustably mounted on an eccentric pin 11a and is pivotally connected to the member 12 at its opposite end which is pivotally connected to the member 13 which is pivotally mounted on the frame member 2 on the bolt 13b. A gear disengaging member 33 is pivotally connected at the connection of the members 12 and 13, as shown best in Fig. 3 of the drawings. It will be noted that the spring 13a operates as an over center spring and tends to hold the operating gear control members 11, 12, 13 and 14 in either the solid line or dash line position, as shown in Fig. 3 of the drawings.

The operating gear control member 14 is arranged to interconnect the control member 13 and the latch member 15 and is pivotally connected therewith at its opposite ends.

The latch member 15 is operatively connected with the latch member control lever 23 and this latch member 15 in connection with the member 14 is arranged to hold the rocker arm operating gear 10 out of mesh with the gear rack 9 when the latch member 16 is shifted upwardly into the dash line position, as shown in Fig. 3 of the drawings preventing the latch member 15 from shifting backwardly into the solid line position, as shown in Fig. 3 of the drawings. The arcuate portion 15a of the latch member 15 is arranged to abut against the upper end of the latch member 16 when in the solid line position, preventing the clamp member 4 from being opened when the rocker arm operating gears 10 are in engagement with the gear racks 9 on the rocker arms 6. In order to release the shiftable clamp member 4 and raise the same, the latch member control lever 23 is shifted, shifting the latch member 15 into dash line position, as shown in Fig. 3 of the drawings and permitting the latch member 16 to shift upwardly to the dash line position in its secure connected relation with the clamp member operating levers 17 and 18 which are connected in operative relation with the shiftable clamp member 4 by means of the clamp member operating link 19.

The clamp fastening members 20 and 21 are pivotally connected together intermediate the clamp member operating lever 17 and the control shaft 25, as shown best in Fig. 3 of the drawings, the fastening member 20 being pivotally mounted on the clamp member operating lever 17 and the fastening member 21 being rigidly secured on the control shaft 25. These fastening members 20 and 21 are each provided with a block 21a, which blocks are arranged to abut against each other at their adjacent edges at one side of the pivotal connection of these clamp fastening members 20 and 21, as shown best in Fig. 3 of the drawings. A bolt 21b is eccentrically mounted between the frame members 1 and 2 and is arranged to support one side edge of the clamp fastening member 20 near its pivotal connection with the clamp fastening member 21, as shown best in Fig. 3 of the drawings.

The fastening member control lever 22 is rigidly connected with the control shaft 25 and is arranged for use in manually shifting the clamp fastening members 20 and 21 into the dash line position, as shown in Fig. 3 of the drawings after the latch member 16 has been released by the latch member control lever 23 in connection with the latch member 15. It will be noted that the rocker arm operating gears 10 cannot mesh with the rocker arm gear rack 9 when the shiftable clamp member 4 is in spaced relation with the stationary clamp member 3 and it will be further noted that the shiftable clamp member 4 cannot be opened relatively with the stationary clamp member 3 until the rocker arm operating gears 10 have been disengaged from the rocker arm gear racks 9.

The control shafts 24 and 25 extend from one end of my sheet metal brake to the other end so that the operator of my sheet metal brake can control the entire mechanism from one end thereof by means of the clamp member operating levers 17, the fastening member control lever 22 and the latch member control lever 23, as shown best in Fig. 1 of the drawings. The end portions 5h of the brake member 5 are positioned in considerable spaced relation from the frame member 2 permitting the passage of relatively wide flange portions of metal through the space A intermediate said end portions 5g and the frame member 2, as shown best in Fig. 1 of the drawings.

The metal supporting member 31, as shown best in Fig. 2 of the drawings is positioned on the upper side of the inclined portion 3b of the stationary clamp member 3 and is arranged to support metal behind the edge member 3c of said stationary clamp member 3. This metal supporting member 31 is especially adapted for use in supporting relatively narrow strips of metal which tend to fall backwardly behind the braking edge 3c when positioning said narrow strips of metal in the brake for bending the same.

It will be noted that the shiftable clamp member 4 is arranged to be pivotally shifted on the bolts 4e so that the pan forming members 4d assumes the position of the clamp portion 4a. It will be noted, however, that the pan forming portions 4d must be removed from the track portions 4c and the bolts 4h in the shiftable clamp member supporting brackets 4g must be removed so that the tubular member 4b may be revolved in a counter clockwise direction substantially 180°, as shown in Fig. 2 of the drawings. The bolts 4h are then replaced and tightened down and the pan forming portions 4d may be placed on the track portions 4c in substantially the position of the clamp portion 4a, as shown best in Fig. 2 of the drawings.

In the modified structure, as shown in Figs. 9, 10 and 11, I have provided a brake member A which is arranged to support a removable edge member B which is provided with an angular relatively narrow edge portion C at its one side and a relatively wide edge portion D at its other side. It will be noted that these edges C and D may be reversed in their relation with the brake member A, as shown in Fig. 10 of the drawings, whereby the relatively wide edge D may be utilized as the braking edge of the brake member A.

It will be further noted that the members E and F of the brake member A are supported and secured together near their extending ends by means of a spacer member G which is welded or otherwise secured between the members E and F providing a channel portion H in the brake member A for supporting the edge member B in various positions therein, as shown in Figs. 9 and 10 of the drawings. This edge member B is arranged to be shifted longitudinally in the channel portion H and this channel portion H is arranged to receive relatively short edge members J which are substantially the cross sectional shape as the edge member B and these edge members J, as shown in Fig. 11 of the drawings, are also longitudinally shiftable in the channel portion H and are arranged to brake portions of metal upwardly when it is desired to brake out a portion intermediate or at the ends of a piece of metal positioned between the clamp members L and M. The clamp member L is provided with a hardened edge member N for use in bending stainless steel or the like.

Though I have shown and described a particular construction, combination and arrangement and a certain modification of parts and portions, I do not wish to be limited to the particular construction, combination and arrangement, nor to the modification but desire to include in the scope of my invention, the construction, combination and arrangement substantially as set forth in the appended claims.

Having thus described my invention, what I claim as new and desire to secure by Letters Patent is:

1. In a sheet metal brake of the class described, the combination of a brake member, a circular in cross section tubular member connected longitudinally therewith substantially the full length of said brake member, and arcuate rocker arms secured to opposite ends of said tubular member outwardly of the ends of said brake member.

2. In a sheet metal brake of the class described, the combination of a brake member, a circular in cross section tubular member connected longitudinally therewith substantially the full length of said brake member, arcuate rocker arms secured to opposite ends of said tubular member outwardly of the ends of said brake member, and roller bearings engageable with arcuate portions of said rocker arms and supporting said rocker arms.

3. In a sheet metal brake of the class described, the combination of a brake member, a tubular member connected longitudinally therewith, arcuate rocker arms secured to opposite ends of said tubular member, bearings engageable with arcuate portions of said rocker arms, a shiftable clamp member, a tubular member connected longitudinally therewith and in cooperative relation with said brake member, said shiftable clamp member provided with track portions and pan forming clamp members mounted on said track portions.

4. In a sheet metal brake of the class described, the combination of arcuate rocker arms, a brake member rigidly connected therewith, gear racks connected with the arcuate portions of said rocker arms, rocker arm operating gears arranged to mesh with said gear racks for shifting said rocker arms, control lever and latch means arranged in connection with said rocker arm operating gears for shifting said rocker arm operating gears in and out of mesh with said gear racks on said rocker arms, clamp member operating levers, a shiftable clamp member connected therewith said clamp member operating levers in cooperative relation with said control lever and latch means, whereby said rocker arm operating gears are out of engagement with said gear racks when said shiftable clamp member is in open position.

5. In a sheet metal brake of the class described, the combination of a shiftable clamp member, eccentric pins arranged to form pivotal supports for said shiftable clamp member, a clamp member adjusting lever in connection with each of said eccentric pins, frame members arranged to support said shiftable clamp member and secondary clamp member adjusting levers engaging said eccentric pins and pivotally mounted on said frame members for shifting said shiftable clamp member forwardly and backwardly relatively with said frame members.

6. In a sheet metal brake of the class described, the combination of a shiftable clamp member, eccentric pins arranged to form pivotal supports for said shiftable clamp member, a clamp member adjusting lever in connection with each of said eccentric pins, frame members arranged to support said shiftable clamp member, secondary clamp member adjusting levers engaging said eccentric pins and pivotally mounted on said frame members for shifting said shiftable clamp member forwardly and backwardly relatively with said frame members, said clamp member provided with supporting bracket members arranged to support the opposite ends of said clamp member in spaced relation with said frame members.

7. In a sheet metal brake of the class described, the combination of a shiftable clamp member, eccentric pins arranged to form pivotal supports for said shiftable clamp member, frame members arranged to support said shiftable clamp member, clamp member adjusting levers engaging said eccentric pins and pivotally mounted on said frame members for shifting said shiftable clamp member forwardly and backwardly relatively with said frame members, said clamp member provided with supporting bracket members arranged to support the opposite ends of said clamp member in spaced relation with said frame members, said shiftable clamp member arranged to be pivotally shifted on said supporting bracket members and provided with opposed exchangeable clamp portions.

8. In a sheet metal brake of the class described, the combination of a shiftable clamp member, eccentric pins arranged to form pivotal supports for said shiftable clamp member, frame members arranged to support said shiftable clamp member, clamp member adjusting levers engaging said eccentric pins and pivotally mounted on said frame members for shifting said shiftable clamp member forwardly and backwardly relatively with said frame members, said clamp member provided with supporting bracket members arranged to support the opposite ends of said clamp members in spaced relation with said frame members, said shiftable clamp member arranged to be pivotally shifted on said supporting bracket members and provided with opposed exchangeable clamp portions, and track portions of said shiftable clamp member arranged to support one of said opposed clamp portions.

9. In a sheet metal brake of the class described, the combination of arcuate rocker arms, a brake member secured thereto, said rocker arms provided with recessed arcuate channel portions, bearings engageable therewith in said arcuate recessed channel portions, frame members at one side of each of said rocker arms arranged to support said bearings and adjustable means in connection with said frame members arranged to support said bearings.

10. In a sheet metal brake of the class described, the combination of arcuate rocker arms, a brake member secured thereto, said rocker arms provided wtih recessed arcuate channel portions, bearings engageable therewith in said arcuate recessed channel portions, frame members arranged to support said bearings, gear racks on said rocker arms, rocker arm operating gears in mesh with said gear racks, a gear disengaging member in connection with said rocker arm operating gears and angularly adjustable counter balance means in connection with said rocker arms.

11. In a sheet metal brake of the class described, the combination of arcuate rocker arms, a brake member secured thereto, said rocker arms provided with recessed arcuate channel portions, bearings engageable therewith in said arcuate recessed channel portions, frame members arranged to support said bearings, gear racks on said rocker arms, rocker arm operating gears in mesh with said gear racks, a gear disengaging member in connection with said rocker arm operating gears, a portion of said rocker arms arranged to engage said gear disengaging member for forcing said rocker arm operating gears out of mesh with said gear racks on said rocker arms.

12. In a sheet metal brake of the class described, the combination of arcuate rocker arms, a brake member secured thereto, said rocker arms provided with recessed arcuate channel portions, bearings engageable therewith in said arcuate recessed channel portions, frame members arranged to support said bearings, gear racks on said rocker arms, rocker arm operating gears in mesh with said gear racks, a gear disengaging member in connection with said rocker arm operating gears, and rocker arm clip members arranged to engage said gear disengaging member for forcing said rocker arm operating gears out of mesh with said gear racks on said rocker arms at any predetermined point.

13. In a sheet metal brake of the class described, the combination of arcuate rocker arms, a brake member secured thereto, said rocker arms provided with arcuate portions, bearings engageable therewith, frame members arranged to support said bearings, gear racks on said rocker arms, rocker arm operating gears in mesh with said gear racks, a gear disengaging member in connection with said rocker arm operating gears, a portion of said rocker arms arranged to engage said gear disengaging member for forcing said rocker arm operating gears out of mesh with said gear racks on said rocker arms.

SAMUEL BOWMAN.